US005974387A

United States Patent [19]

Kageyama et al.

[11] Patent Number: 5,974,387

[45] Date of Patent: Oct. 26, 1999

[54] AUDIO RECOMPRESSION FROM HIGHER RATES FOR KARAOKE, VIDEO GAMES, AND OTHER APPLICATIONS

[75] Inventors: Yasuo Kageyama; Shinji Koezuka; Youji Semba, all of Hamamatsu, Japan

[73] Assignee: Yamaha Corporation, Hamamatsu, Japan

[21] Appl. No.: 08/877,169

[22] Filed: Jun. 17, 1997

[30] Foreign Application Priority Data

| | | | |
|---|---|---|---|
| Jun. 19, 1996 | [JP] | Japan | 8-178535 |
| Jun. 19, 1996 | [JP] | Japan | 8-178536 |
| Jun. 19, 1996 | [JP] | Japan | 8-178537 |
| Jun. 19, 1996 | [JP] | Japan | 8-178538 |

[51] Int. Cl.[6] .......... H04B 1/66; G10H 7/00

[52] U.S. Cl. .......... 704/500; 84/645

[58] Field of Search .......... 704/500; 84/645

[56] References Cited

U.S. PATENT DOCUMENTS

| | | | |
|---|---|---|---|
| 5,054,360 | 10/1991 | Lisle et al. | 84/645 |
| 5,086,471 | 2/1992 | Tanaka et al. | 704/222 |
| 5,388,181 | 2/1995 | Anderson et al. | 704/203 |
| 5,490,130 | 2/1996 | Akagiri | 369/124 |
| 5,530,750 | 6/1996 | Akagiri | 380/4 |
| 5,767,430 | 6/1998 | Yamanoue et al. | 84/602 |

*Primary Examiner*—David R. Hudspeth
*Assistant Examiner*—Tālivaldis Ivars Šmits
*Attorney, Agent, or Firm*—Pillsbury Madison & Sutro LLP

[57] ABSTRACT

Sampled sound data is compressed with a vector quantizing technique and then transmitted via a communication line. Received sound data is decoded, compressed with an ADPCM technique, and then stored into a memory. In response to a request for reproduction, the ADPCM sound data is read out, decoded, and then sounded. As another example, in a karaoke device, sample sound data is supplied after being compressed with the vector quantizing technique, in addition to MIDI-form music performance data. A music sound is reproduced on the basis of the MIDI-form music performance data, and at the same time a sound is reproduced by decoding the vector-quantized sound data. As another example, in a karaoke device, data obtained by compressing sampled sound data with the vector quantizing technique is mixed with data obtained by compressing sampled data with the ADPCM technique, and in reproduction, a predetermined decoding process is executed after identifying with which of technique is compressed data to be reproduced. As still another example, in a game device, sampled sound data, of human voice, effect sound, etc. are prestored after being compressed with the vector quantizing technique, so that in accordance with progression of a game, the data are read out and decoded for reproductive sounding.

17 Claims, 8 Drawing Sheets

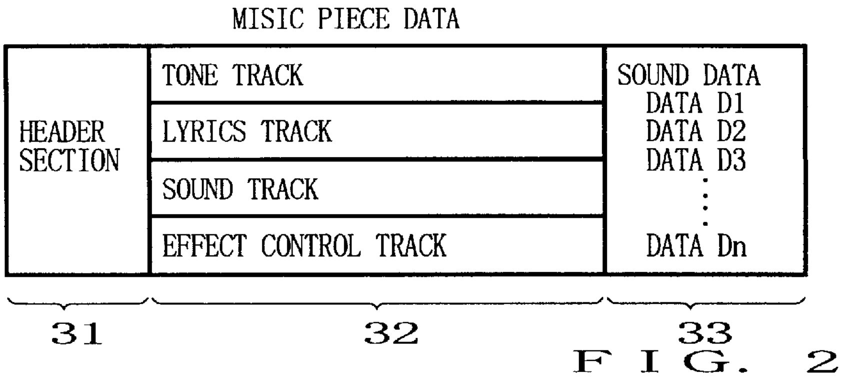
FIG. 2A
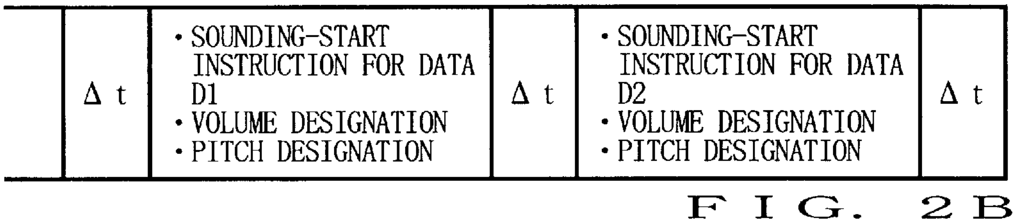
FIG. 2B
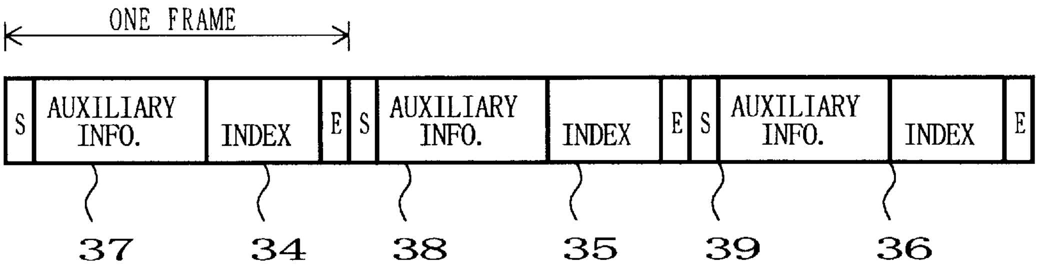
FIG. 2C
8 CODE BOOK
| INDEX | SPECTRAL PATTERN |
|---|---|
| 1 | SPECTRAL PATTERN 1 |
| 2 | SPECTRAL PATTERN 2 |
| 3 | SPECTRAL PATTERN 3 |
| ⋮ | ⋮ |
FIG. 3

AUDIO RECOMPRESSION FROM HIGHER RATES FOR KARAOKE, VIDEO GAMES, AND OTHER APPLICATIONS

BACKGROUND OF THE INVENTION

The present invention relates generally to a sound reproducing device and sound reproducing method by which compressed sound waveform data is transferred and a receiving end decodes and audibly reproduces the sound waveform data. More particularly, the present invention relates to a sound reproducing device and sound reproducing method which use different sound-waveform-data compressing techniques between a case where a sound needs to be generated in real time and a case where a sound need not be generated in real time.

The present invention also relates to a sound reproducing technique for use in karaoke or the like which is characterized by an improved data compressing technique to compress sampled sound or sound waveform data for subsequent storage.

The present invention also relates to a sound reproducing technique for use in karaoke or the like which allows any one or more of different data compressing techniques to be selectively employed when sampled sound or sound waveform data is to be used in compressed data form.

The present invention also relates to a game device which is capable of providing a sound or waveform data, to be audibly reproduced in accordance with progression of a game program, in compressed data form.

Among a variety of conventionally known music reproducing devices are "karaoke" devices. The karaoke device, in its simplest form, used to reproduce a selected music piece from a magnetic tape that has prerecorded thereon the music piece in the form of analog signals. However, with the developments in electronic technology, magnetic tapes have almost been replaced by CDs (Compact Disks) or LDs (Laser Disks), so that analog signals to be recorded thereon have been replaced by digital signals and data to be recorded with the digital signals have come to include various additional information, such as image data and lyrics data, accompanying the fundamental music piece data.

Recently, in place of CDs or LDs, communication-type karaoke devices have come to be widely used at a rapid speed. Such communication-type karaoke devices may be generally classified into two types: the non-accumulating type where a set of data on a music piece (i.e., music piece data) to be reproduced is received via a communication line each time the music piece is selected for reproduction; and the accumulating type where each set of music piece data received via the communication line is accumulatively stored in an internal storage device (hard disk device) of the karaoke device in such a manner that a particular one of the accumulated sets of music piece data is read out from the storage device each time it is selected. At present, the accumulating type karaoke devices are more popular than the non-accumulating type karaoke devices in terms of the communicating cost.

In most of these communication-type karaoke devices, there are employed latest or newest data compressing and communicating techniques with a view to minimizing a total data quantity of music piece data per music piece to thereby achieve a minimized communicating time (and hence communicating cost) and minimized necessary storage space. In other words, the communication-type karaoke devices are not satisfactory in terms of the required communicating cost and communicating time if they use conventional PCM data (i.e., data obtained by sampling the whole of a music piece) exactly the way they are recorded on a CD or LD. Thus, in the conventional communication-type karaoke devices, performance-related data, contained in the music piece data, are converted or coded into data conforming to the MIDI (Musical Instrument Digital Interface) standards (hereinafter referred to as "MIDI data"), and also human voice sounds as in a back chorus, which are difficult to code into MIDI data, are PCM-coded to be expressed in a data-compressed code form. Typically, an ADPCM (Adaptive Differential Pulse Code Modulation) form has been conventionally used as the data-compressed code form. This can reduce a total data quantity of music piece data per music piece, to thereby effectively save communicating time and storage capacity.

Although in the compressed data form, the ADPCM data are still far greater in total data quantity than the MIDI data and thus would occupy a great part (about two-thirds) of the available storage capacity in the karaoke device, which has been one of the main factors that limit the number of music piece data accumulable in the storage device of the karaoke device. This would also considerably limit a reduction in the time and cost necessary for communication of the music piece data.

Further, conventionally-known electronic game devices are designed to allow a game to progress and perform music, visually display images and audibly generate sounds (such as human voices and effect sounds) in accordance with the progression of the game, by sequentially executing a program for the body of the game and also sequentially reading out additional data, such as BGM (Background Music) data, image data and sound data, relating to the game.

However, with game devices equipped with no CD-ROM drive, i.e., game devices of a type where a ROM cartridge is removably attached, the game program and minimally necessary additional data must be pre-written in the ROM, which are absolutely essential to the progression of the game and can never be abridged. The BGM data, which are formed of data conforming to the MIDI standards, do not require a great storage space, and hence abridging the BGM data would not substantially save storage capacity. In contrast, the sound data are less frequently used in the progressing game and can be replaced by character data for visual display as character images, although they are greater in total data quantity than the BGM data; thus, the sound data may often be partly abridged without adversely influencing the progression of the game.

Therefore, in today's game devices and the like using such a ROM cartridge, the minimally necessary sound data are stored into a limited area of the cartridge only after the essential game program, image data and BGM data have been written in the cartridge. So, in the game devices of the type where the sound data are stored in such a ROM cartridge, the ADPCM technique is employed, as a means to compress the sound data, in order to minimize a necessary storage space for the sound data. This data compressing technique permits a significant reduction in the total data quantity of the sound data, so that the sound data can be stored in the ROM cartridge or the like in sufficient quantities to highly enhance musical effects during the progression of the game.

However, with recent game software, the program for the game body and image data are getting increasingly large in size, which would inevitably limit the storage area, in the ROM cartridge, to be used for the BGM data and sound data. Thus, the ADPCM data, which, although in compressed data form, are much greater in total data quantity that the MIDI data, have to be further abridged by being converted into character data, with the result that only the minimally necessary sound data can be stored in the ROM cartridge. This would present the problem that a total quantity of the sound data storable in the ROM cartridge can not be significantly increased even though the sound data are compressed by the ADPCM compressing technique.

SUMMARY OF THE INVENTION

It is therefore an object of the present invention to provide a sound reproducing device and sound reproducing method which can effectively save storage capacity and/or communicating time by compressing sampled sound or sound waveform data with a higher compression rate.

It is another object of the present invention to provide a music reproducing device, such as a karaoke device, which accomplishes the above-mentioned object.

Although it may generally be desirable to promote further data compression, data compressed with a higher compression rate would take a longer time for decoding, and thus appropriate consideration has to be made in preparation for a situation where a sound must be reproduced in real time in response to a sound generating request.

Therefore, it is still another object of the present invention to provide a sound reproducing device and sound reproducing method which use different sound-waveform-data compressing techniques between a case where a sound needs to be generated promptly in real time and a case where a sound need not be generated promptly in real time.

It is still another object of the present invention to provide a music reproducing device and music reproducing method which allows any one or more of different data compressing techniques to be selectively used for compressing sampled sound or sound waveform data.

It is still another object of the present invention to provide an electronic game device which accomplishes the above-mentioned object. More specifically, the object is to provide an electronic game device which can handle a sufficient number of sound data even with a storage medium, such as a ROM cartridge, having a limited storage capacity, by placing in the body of the game device a code book that is a table for converting index information into a sound spectrum.

It should be noted that the term "sound" appearing herein is used to broadly refer to not only a human voice but also any other optional sound such as an effect sound or imitation sound. Further, the term "sound data" or "sound waveform data" is used herein to refer to data other than MIDI data, and more particularly to data based on sampled waveform data. Namely, sampled waveform data (PCM data) is basically referred to as "sound data" or "sound waveform data", and data obtained by compressing the sampled waveform data as necessary is also referred to as "sound data" or "sound waveform data".

In order to accomplish the above-mentioned objects, the present invention provides a sound reproducing device which comprises: a receiving device that receives, from outside the sound reproducing device, sound data compressed with a predetermined first data compressing technique; a first decoding device that decodes the sound data received via the receiving device; a data compressing device that compresses the sound data, decoded by the first decoding device, with a predetermined second data compressing technique, the first data compressing technique using a data compression rate higher than a data compression rate used by the second data compressing technique; a second decoding device that decodes the sound data compressed with the second data compressing technique; and a device that generates a sound signal based on the sound data decoded by the second decoding device.

In the sound reproducing device, sound data received from the outside is data compressed with the first data compressing technique using a high compression rate. Thus, where the data compressed with the first data compressing technique is received via a communication line, it is possible to effectively save time and cost for communication. The received sound data is decoded with first decoding device and then compressed by the data compressing device with the second data compressing technique. After that, the sound data thus compressed with the second data compressing technique is decoded by the second decoding device so that a music sound is generated on the basis of the decoded sound data. Because the second data compressing technique uses a compression rate lower than that used by the first data compressing technique, it does not take a long time to decode the compressed sound data, and thus a request for real-time sounding can be met with a quick response. So, by using different sound-waveform-compressing techniques between the case where a sound needs to be generated in real time and the case where a sound need not be generated in real time, saving communicating time and real-time responsiveness can be made compatible with each other.

As an example, the sound data compressed with the first data compressing technique is expressed by a combination of information specifying a spectrum pattern and a spectrum envelope of the sound data with a vector quantizing technique, and the second data compressing technique is based on an adaptive differential pulse code modulation (ADPCM) technique. For example, the vector quantizing technique uses a compression rate about three time as high as that used by the ADPCM technique.

In the conventionally-known karaoke devices, for sampled sound data of back chorus or the like, sound data compressed with the ADPCM data compressing technique (ADPCM sound data) are stored so that an additional performance of back chorus or the like is executed by decoding and reproducing the stored sound data. Thus, by using the ADPCM data compressing technique as the above-mentioned second data compressing technique, the reproducing mechanism in the conventional karaoke device can be directly used in the present invention. That is, by transmitting, along a transmission channel, sound data compressed with the vector quantizing technique using the higher compression rate, it is possible to significantly reduce the necessary data transmission time as compared to the case where the conventional ADPCM sound data is transmitted. However, most of the currently used karaoke devices are unable to handle vector-quantized sound data although they can handle ADPCM sound data. So, according to the present invention, the karaoke device decodes vector-quantized sound data into original sound data and also compresses the decoded sound data with the ADPCM data compressing technique. This arrangement allows vector-quantized sound data to be transferred to a karaoke device which only can handle ADPCM sound data.

The vector-quantized sound data is insusceptible to noise (has high robustness). Thus, in non-real-time transfer of the sound data for storage into memory, the sound data can be compressed with a compressing technique of high robustness and high compression rate, but in real-time transfer of the sound data for sounding, the conventional (ADPCM) compressing technique of low robustness and low compression rate can be directly used to compress the sound data.

The present invention also provides a music reproducing device which comprises a storage device that, for a given music piece, stores therein music performance data to be used for reproduction of music and sound data to be reproduced with the music, the sound data being expressed in compressed data form by a combination of information specifying a spectrum pattern and a spectrum envelope with a vector quantizing technique; a readout device that reads out the music performance data and sound data from the storage device, in response to an instruction to reproductively perform the music piece; a tone generating device that generates a music sound on the basis of the music performance data read out from the storage device; a decoding device that decodes the sound data read out from the storage device, to generate a sound waveform signal; and a device that acoustically generates a sound of the sound data decoded by the decoding device and the music sound generated by the tone generating device.

In the music reproducing device, sampled sound data of back chorus or the like, which was traditionally compressed with the ADPCM data compressing technique, is compressed with the vector quantizing technique using a compression rate higher than that used by the ADPCM data compressing technique and stored into the storage device. This can substantially save storage capacity. Further, if the sound data compressed with the vector quantizing technique is received via a communication line or the like, it is possible to effectively save both communicating time and communicating cost.

The present invention also provides a music reproducing device which comprises; a data supply device that supplies music performance data to be used for reproduction of music and sound data to be reproduced with the music, the sound data being compressed with one of a plurality of different data compressing techniques; an identifying device that identifies with which of the data compressing techniques is compressed the sound data supplied by the data supply device; a decoding device that decodes the sound data in accordance with the data compressing technique identified by the identifying device; a tone generating device that generates a music sound on the basis of the music performance data supplied by the data supply device; and a device that acoustically generates a sound of the decoded sound data and the music sound generated by the tone generating device.

With the arrangement that the identifying device identifies with which of the different data compressing techniques is compressed the sound data supplied by the data supply device and the decoding device decodes the sound data in accordance with the data compressing technique identified by the identifying device, a selective use of any one or more of the different data compressing techniques is permitted in the case where sampled sound or sound waveform data is used in compressed data form. For example, it is possible to handle both sound data compressed with the vector quantizing technique and sound data compressed with the ADPCM technique. This way, it is possible to handle ADPCM sound data as in the past and to also properly deal with an application where storage capacity and communicating time are to be saved by using sound data compressed with the vector quantizing technique.

The present invention also provides an electronic game device which comprises: a device that generates sound data in accordance with progression of a game program, the sound data being expressed in compressed data form in accordance with a vector quantizing technique; a decoding device that decodes the generated sound data; and a device that acoustically generates a sound of the decoded sound data.

In the electronic game device, sampled sound data of a human voice, effect sound or the like, which was traditionally compressed with the ADPCM data compressing technique, is compressed with the vector quantizing technique using a compression rate higher than that used by the ADPCM data compressing technique and stored a the storage device. This can substantially save storage capacity. Namely, sound data compressed with the vector quantizing technique (vector-quantized sound data) is stored in a storage medium, such as a ROM cartridge, of limited storage capacity where a program is stored, and also the decoding device containing a conversion table for decoding the compressed data is placed within the body of the game device. With this arrangement, a greater number of sound data can be stored in a given storage area of predetermined capacity as compared with the case where ADPCM sound data are stored as in the past. Thus, the game device of the invention is capable of generating proper, diversified and high-quality sounds in accordance with progression of a game, thereby significantly increasing the pleasure afforded by the game.

BRIEF DESCRIPTION OF THE DRAWINGS

For better understanding of the above and other features of the present invention, the preferred embodiments of the invention will be described in greater detail below with reference to the accompanying drawings, in which:

FIGS. 2A to 2C are diagrams showing exemplary formats of music piece data to be used in the karaoke device of FIG. 1;

FIG. 3 is a diagram illustrating exemplary table contents of a code book of FIG. 1;

DETAILED DESCRIPTION OF THE PREFERRED EMBODIMENTS

Figure 1:
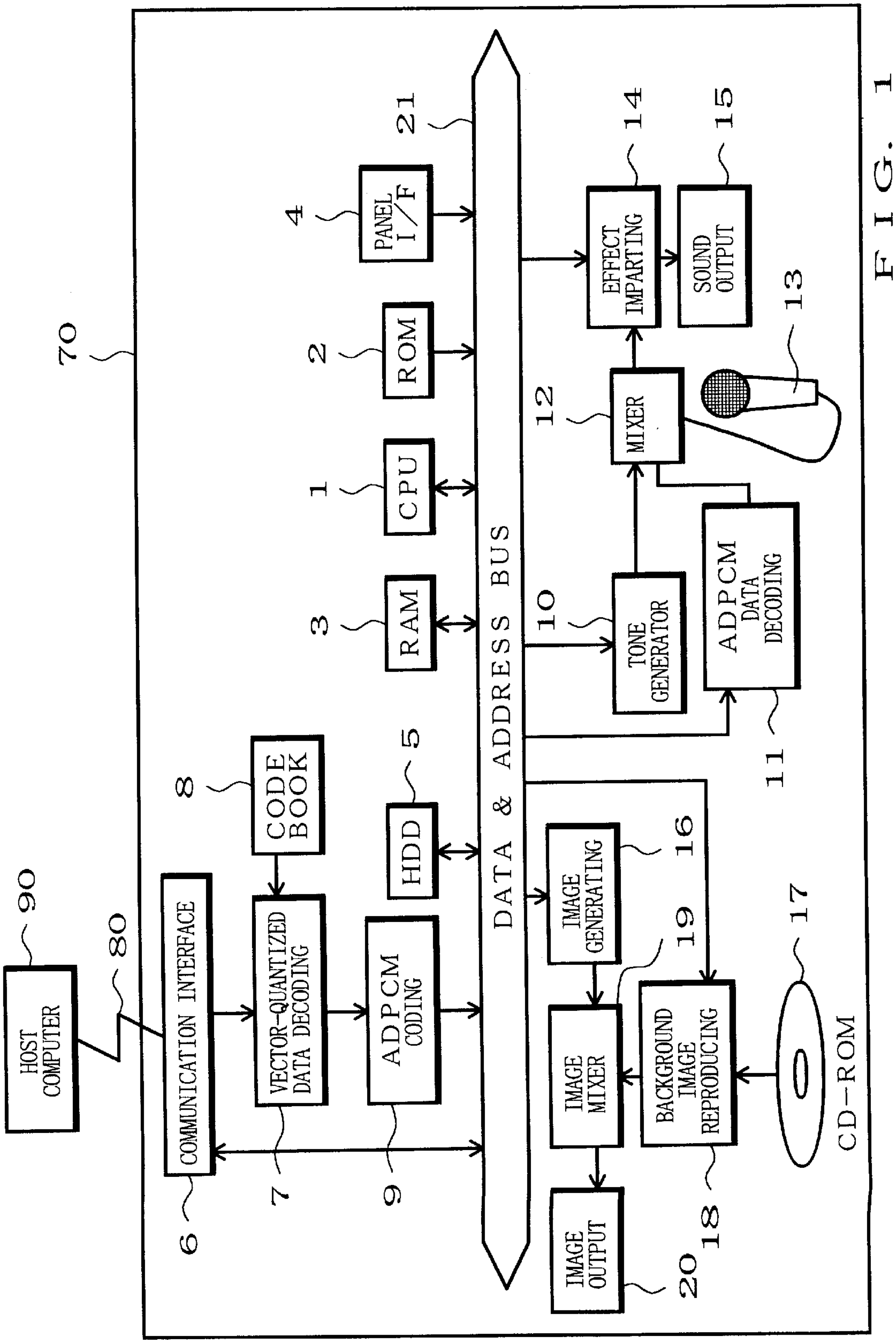
FIG. 1 is a block diagram illustrating an overall hardware structure of a first embodiment of a karaoke device employing a sound reproducing device according to the present invention.

FIG. 1 is a block diagram illustrating an overall hardware structure of a first embodiment of a karaoke device 70 as an example of a sound reproducing device according to the present invention.

This embodiment will be described hereinbelow in relation to a so-called "accumulating-type" karaoke device 70, which is a terminal device connected to a central host computer 90 via a communication interface 6 and a communication network 80, so as to receive one or more music piece data transmitted from the host computer 90 and store the received data into an internal hard disk.

According to the first embodiment, the central host computer 90 compresses digital sound data D1–Dn of a music piece using a "vector quantizing technique" permitting data compression at a relatively high compression rate, and adds the compressed digital sound data (hereinafter referred to as "vector-quantized sound data") to header and MIDI data sections of the music piece data to thereby form music piece data as shown in FIG. 2A. The central host computer 90 transmits the thus-formed music piece data to the karaoke device 70 via the communication network 80 in accordance with a predetermined communication scheme. The karaoke device 70, having received the music piece data from the host computer 90, converts the vector-quantized sound data of the music piece data into ADPCM (Adaptive Differential Pulse Code Modulated) sound data with an ADPCM technique using a lower compression rate than that used by the vector quantizing technique. The resultant converted ADPCM data are then stored into a hard disk device (HDD) 5 of the karaoke device 70. The above-mentioned "vector-quantized sound data" will be later described in detail with reference to FIG. 4.

The karaoke device 70 comprises a microprocessor unit (CPU) 1, a memory 2 such as a ROM (Read Only Memoy) having operation programs prestored therein and a working and data memory 3 such as a RAM (Random Access Memory), and it carries out various operations under the control of a microcomputer system.

The CPU 1 controls overall operations of the karaoke device 70. To the CPU 1 are connected, via a data and address bus 21, the program memory 2, working and data memory 3, panel interface 4, hard disk device (HDD) 5, ADPCM coding device 9, tone generator circuit 10, ADPCM data decoding device 11, effect imparting circuit 14, image generating circuit 16 and background image reproducing circuit 18. One or more accessories, such as a background image reproducing device including a MIDI interface circuit and auto. changer for a laser disk (LD) or compact disk (CD), may also be connected to the CPU 1, although description of such accessories is omitted here.

The program memory 2, which is a read-only memory (ROM), has prestored therein system-related programs for the CPU 1, a program for loading system-related programs stored in the hard disk device 5, and a variety of parameters, data, etc.

The working and data memory 3, which is for temporarily storing the system program loaded from the hard disk device 5 and various data generated as the CPU 1 executes the programs, is provided in predetermined address regions to be used as registers and flags.

The panel interface (I/F) 4 converts an instruction, from any of various operators on an operation panel (not shown) of the karaoke device 70 or from a remote controller, into a signal processable by the CPU 1 and delivers the converted signal to the data and address bus 21.

The hard disk device 5 has a storage capacity within a range of, for example, several hundred megabytes to several gigabytes and stores therein karaoke operation system programs for the karaoke device 70. According to the present invention, sound data (e. g., human voice data for back chorus), namely, sampled sound waveform data in the music piece data stored in the hard disk device 5 are compressed into ADPCM data. Of course, note data and other data in the music piece data which can be expressed as MIDI-standard data are stored in the MIDI format. It should be obvious that the music piece data may be stored into the hard disk device 5 not only by being supplied via the communication network 80 from the host computer 90 but also by being read in via a floppy disk driver, CD-ROM driver (not shown) or otherwise.

In accordance with its communication scheme, the communication interface 6 reproduces music piece data, transmitted via the communication network 80, as data of the original header section, MIDI data section and sound data section (vector-quantized sound data) and delivers the data to a vector-quantized data decoding device 7.

The vector-quantized data decoding device 7 converts index information 34 contained the vector-quantized sound data, received via the communication interface 6, into a spectral pattern on the basis of a code book 8, and reproduces the original digital sound data on the basis of the converted spectral pattern and auxiliary information. Then, the vector-quantized data decoding device 7 supplies the reproduced or decoded data to an ADPCM coding device 9 along with the data of the header and MIDI data sections.

The code book 8 is a conversion table for converting the index information to a spectral pattern of sound data, and may be a dedicated memory or may be provided in a suitable area within the hard disk device 5. Data to be stored in the code book 8 may be supplied via the communication network 80 or read in from the floppy disk driver or CD-ROM driver.

The ADPCM coding device 9 codes the digital sound data, decoded by the vector-quantized data decoding device 7, into ADPCM data. Music piece data containing the sound data coded into ADPCM data by the ADPCM coding device 9 are stored into the hard disk device 5.

Namely, the karaoke device 70 according to the above-described embodiment receives music piece data containing sound data, compressed by a vector quantizing technique capable of data compression at a higher compression rate than the ADPCM data compressing technique, and then decodes the sound data in the received music piece data using the vector quantizing technique. After that, the karaoke device 70 again compresses the decoded sound data using the ADPCM data compressing technique to insert the re-compressed sound data in the music piece data for subsequent storage into the hard disk device 5 or direct transfer to an ADPCM data decoding device 11.

The tone generator circuit 10, which is capable of simultaneously generating tone signals in a plurality of channels, receives tone data of a tone track, complying with the MIDI standard, supplied by way of the data and address bus 21, generates tone signals based on the received tone data, and then feeds the generated tone signals to a mixer circuit 12.

The tone generation channels to simultaneously generate a plurality of tone signals in the tone generator circuit 10 may be implemented by using a single circuit on a time-divisional basis or by providing a separate circuit for each of the channels.

Any tone signal generation method may be used in the tone generator circuit 10 depending on an application intended. For example, any conventionally known tone signal generation method may be used such as: the memory readout method where tone waveform sample value data stored in a waveform memory are sequentially read out in accordance with address data that change in correspondence to the pitch of tone to be generated; the FM method where tone waveform sample value data are obtained by performing predetermined frequency modulation operations using the above-mentioned address data as phase angle parameter data; or the AM method where tone waveform sample value data are obtained by performing predetermined amplitude modulation operations using the above-mentioned address data as phase angle parameter data. Other than the above-mentioned, the tone generator circuit 10 may also use the physical model method where a tone waveform is synthesized by algorithms simulating a tone generation principle of a natural musical instrument; the harmonics synthesis method where a tone waveform is synthesized by adding a plurality of harmonics to a fundamental wave; the formant synthesis method where a tone waveform is synthesized by use of a formant waveform having a specific spectral distribution; or the analog synthesizer method using VCO, VCF and VCA. Further, the tone generator circuit 10 may be implemented by a combined use of a DSP and microprograms or of a CPU and software programs, rather than by dedicated hardware.

The ADPCM data decoding device 11 expands the ADPCM data contained in the music piece data from the hard disk device 5 or in the music piece data fed from the ADPCM coding device 9 by performing bit-converting and frequency-converting processes on the ADPCM data, to thereby reproduce an original sound signal (PCM signal). Note that the ADPCM data decoding device 11 may sometimes generate a sound signal pitch-shifted in accordance with predetermined pitch information.

The mixer circuit 12 mixes a tone signal from the tone generator circuit 10, a sound signal from the ADPCM data decoding device 11 and a sound signal from the microphone 13, and then feeds the mixed result to the effect imparting circuit 14.

The effect imparting circuit 14 imparts a musical effect, such as echo and/or reverberation, to the mixed result fed from the mixer circuit 12 and then supplies the resultant effect-imparted signal to a sound output device 15. The effect imparting circuit 14 determines the kind and degree of each effect to be imparted, in accordance with control data stored on an effect control track of the music piece data.

The sound output device 15 audibly reproduces or sounds the tone and sound signals by means of a sound system comprising amplifiers and speakers. Of course, D/A converters are provided at appropriate points, although they are not specifically shown in the figure. Depending on where the D/A converted are located, the mixer circuit 12 can function either as a digital mixer or as an analog mixer, and the effect imparting circuit 14 can function either as a digital effector or as an analog effector.

The image generating circuit 16 generates images of lyrics (i.e., words of a song) to be visually displayed, on the basis of character codes created from MIDI data recorded on a lyrics track, character data indicative of a particular place where the images are to be displayed, display time data indicative of a particular time length through which the images are to be displayed, and wipe sequence data for sequentially varying a displayed color of the lyrics in accordance with the progression of the music piece.

The background image reproducing circuit 18 selectively reproduces, from a CD-ROM 17, a predetermined background image corresponding to the genre or type of the music piece to be performed and feeds the reproduced background image to an image mixer circuit 19.

The image mixer circuit 19 superimposes the lyrics images fed from the image generating circuit 16 over the background image fed from the background image reproducing circuit 18 and supplies the resultant superimposed image to an image output circuit 20.

The image output circuit 20 visually displays a synthesis or mixture of the background image and lyrics images fed from the image mixer circuit 19.

FIG. 2 shows an exemplary format of music piece data for a single music piece which the karaoke device 70 of FIG. 1 receives via the communication network.

As shown in FIG. 2A, the music piece data include a header section 31, a MIDI data section 32 and a sound data section 33.

The header section 31 contains various data relating to the music piece data, which are, for example, data indicative of the name of the music piece, the genre of the music piece, the date of release of the music piece data, the duration of the music performance based on the music piece data, etc. In some cases, the header section 31 may contain various additional information such as the date of the communication and the date and number of times of access to the music piece data.

The MIDI data section 32 comprises a tone track, a lyrics track, a sound track and an effect control track. On the tone track are recorded performance data for a melody part, accompaniment part, rhythm part, etc. corresponding to the music piece. The performance data, which are a set of data conforming to the MIDI standards, includes duration time data $\Delta t$ indicative of a time interval between events, status data indicative of a sort of the event (such as a sounding start instruction or sounding end instruction), pitch designating data for designating a pitch of each tone to be generated or deadened, and tone volume designating data for designating a volume of each tone to be generated. The last-said tone volume designating data is recorded when the status data indicates a sounding start instruction.

On the lyrics track are recorded, in the MIDI system exclusive message format, data relating to lyrics to be displayed on a monitor screen (not shown). Namely, the MIDI data recorded on this lyrics track includes character codes corresponding to the lyrics to be displayed, character data on a particular place where the lyrics are to be displayed, display time data indicative of a particular time length through which the lyrics are to be displayed, and wipe sequence data for sequentially varying a displayed color of the lyrics in accordance with the progression of the music piece.

On the sound track are recorded, in the MIDI system exclusive message format as shown in FIG. 2B, data instructing audible reproduction or sounding of sound data recorded in the sound data section 33. Namely, the MIDI data recorded on the sound track includes data designating sounding timing, data designating particular sound data to be sounded at the designated sounding timing, data indicative of a sounded volume of the sound data and data designating a pitch of the sound data.

On the effect control track is recorded MIDI data relating to control of the effect imparting circuit 14.

The data on the lyrics track and effect control track are transmitted and stored into the hard disk device 5 as data conforming to the MIDI standards as shown in FIG. 2B.

Because the data in the MIDI data section 32 conform to the MIDI standards, they are transmitted without being compressed at all, whereas the data in the sound data 33 are transmitted after being compressed by the vector quantizing technique.

The karaoke device 70 decodes vector-quantized sound data in music piece data received via the communication network 80 and communication interface 6. Then, in the karaoke device 70, the decoded digital sound data is converted into ADPCM data by means of the ADPCM coding device 9 and written into the hard disk device 5.

As a consequence, the music piece data written in the hard disk device 5 will contain ADPCM sound data as in the conventionally known karaoke devices. Namely, the karaoke device according to the current embodiment can be implemented by adding the vector-quantized data decoding device 7, code book 8 and ADPCM coding device 9.

FIG. 2C is a diagram illustratively showing a format of data quantized by the vector quantizing technique and stored in the sound data section 33. The data D1–Dn stored in the sound data section 33 include auxiliary information 37 to 39 relating to to spectrum envelopes of sound data of a back chorus, model sound, duet sound, etc. to be sounded with the music piece, and index information 34 to 36 specifying respective spectral patterns of the sound data. Start and end data S and E are attached to the beginning and end, respectively, of each frame. Although only three frames, each including the index and auxiliary information, are shown in FIG. 2C, the sound data section 33, in practice, comprises a greater number of such frames.

FIG. 3 is a diagram illustrating exemplary contents of the code book 8. For example, when the index information is indicative of a value "1", spectral pattern 1 is read out from the code book 8 as a spectrum of the corresponding frame, when the index information is indicative of a value "2", spectral pattern 2 is read out from the code book 8 as a spectrum of the corresponding frame, and so forth.

Figure 4:
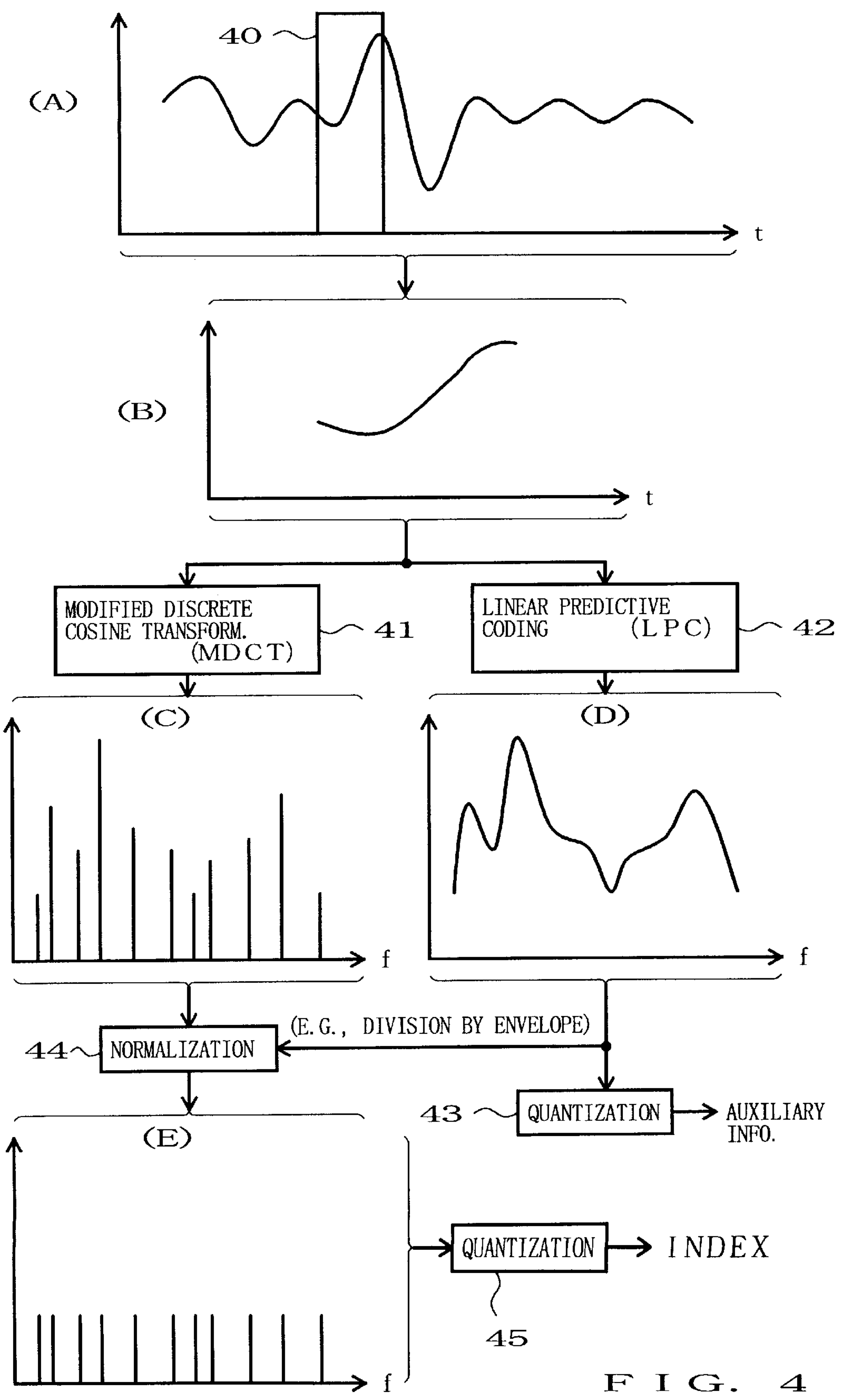
FIG. 4 is a diagram outlining a manner in which sound data is quantized, by a vector quantizing technique, into index information and auxiliary information.

FIG. 4 is a diagram explanatory of a manner in which sound data is compressed into vector-quantized sound data as noted earlier.

When sound data as shown at (A) of FIG. 4 is present, a partial region of the sound data, such as denoted by a rectangular block 40, is extracted as shown at (B) of FIG. 4. Resultant extracted waveform data shown at (B) of FIG. 4 is delivered to the a MDCT (Modified Discrete Cosine Transformation) section 41, which executes a discrete cosine conversion, discrete Fourier conversion or the like so as to convert the data into a frequency-domain signal, i.e., spectrum signal as shown at (C) of FIG. 4.

The extracted waveform data is also delivered to a linear predictive coding (LPC) section 42, which converts the delivered data into spectrum envelope information as shown at (D) of FIG. 4. Quantizing section 43 quantizes the spectrum envelope information and corresponding sound power information as auxiliary information.

The frequency-domain signal (spectrum signal) shown at (C) of FIG. 4 is converted, via a normalizing section 44, into a normalized spectrum pattern as shown at (E) of FIG. 4. Although the frequency-domain signal shown at (E) of FIG. 4 is explained here as being divided by the spectrum envelope information as shown at (D) of FIG. 4 in order to provide the normalized spectrum pattern, the signal may be normalized in any other appropriate manner.

The normalized spectrum pattern is fed to another quantizing section 45, which quantizes the fed spectral pattern into index information corresponding to one of the spectral patterns stored in the code book 8 that is closest to the fed spectral pattern.

Then, the auxiliary information and index information quantized by the quantizing section 43 and quantizing section 45, respectively, will be arranged as shown in FIG. 2C and communicated as vector-quantized sound data indicative of data D1–Dn of the sound data section.

Once music piece data, containing vector-quantized sound data as data of the sound data section, are received via the communication network 80 and communication interface 6, the karaoke device 70 decodes the received data into original digital sound data (PCM data) by means of the vector-quantized data decoding device 7.

Figure 5:
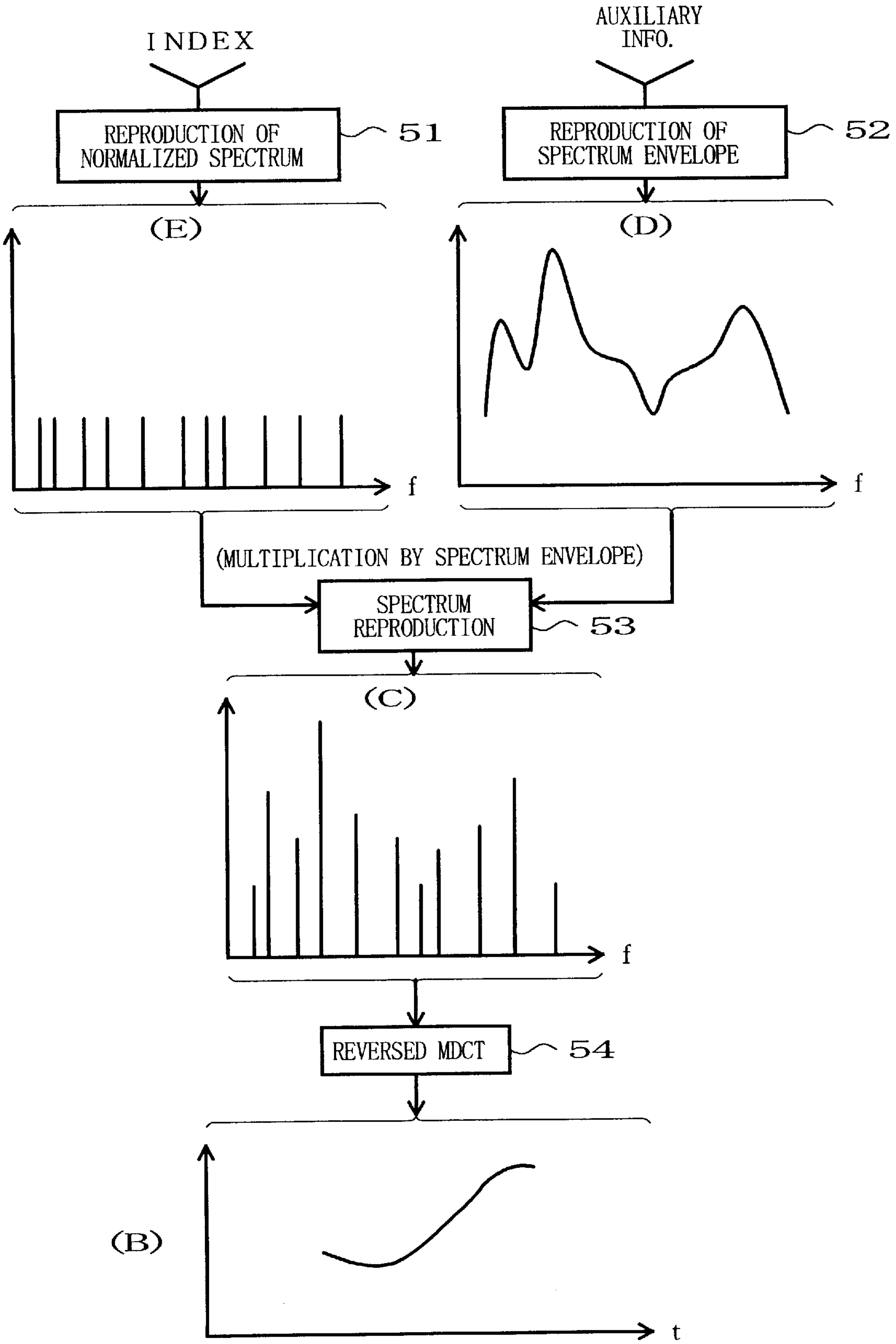
FIG. 5 is a diagram outlining a manner in which original sound data is decoded on the basis of vector-quantized sound data compressed by the vector quantizing technique.

FIG. 5 is a diagram explanatory of the operation performed by the vector-quantized data decoding device 7 to decode the vector-quantized sound data into the corresponding original digital sound data. (B), (C), (D) and (E) of FIG. 5 correspond to (B), (C), (D) and (E) of FIG. 4.

In the vector-quantized data decoding device 7, a normalized spectrum reproducing section 51 reads out a spectrum pattern, as shown at (E) of FIG. 5, from the code book 8 of FIG. 3, on the basis of index information 34–36. A spectrum envelope reproducing section 52 reproduces spectrum envelope information, as shown at (D) of FIG. 5, on the basis of index information 37–39. A spectrum reproducing section 53 multiplies the spectrum pattern from the normalized spectrum reproducing section 51 by the spectrum envelope information from the spectrum envelope reproducing section 52 so as to reproduce a spectrum signal as shown at (C) of FIG. 5. A reversed MDCT section 54 performs a reversed MDCT process on the spectrum signal from the spectrum reproducing section 53 so as to reproduce a part of original digital sound data as shown at (D) of FIG. 5.

The reproduced digital sound data (PCM data) is then converted, via the ADPCM coding device 9, into ADPCM data, which is then stored into the hard disk device 5 or fed to the ADPCM data decoding device 11 along with data in the header and MIDI data sections 31 and 32. Note that the vector-quantized data to be decoded may be directly coded into ADPCM data.

Whereas the current embodiment has been described above in relation to the case where the vector quantizing technique is used as the data compressing technique using a compression rate higher than that used by the ADPCM data compressing technique, any other suitable data compressing technique may be employed.

Further, whereas the current embodiment has been described above in relation to the case where sound data is transmitted after being compressed by the vector quantizing technique, other data, such as background image data, may also be transmitted after being compressed by the vector quantizing technique.

Moreover, whereas the current embodiment has been described above in relation to the case where the host computer 90 transmits data to a single karaoke device 70 via the communication line 80, the present invention may of course be applied to a case where the host computer 90 transmits data to a sub-host computer comprising a vector-quantized data decoding device, code book and ADPCM coding device so that music piece data, coded into ADPCM data by the ADPCM coding device in the sub-host computer, is distributed to individual karaoke devices in a plurality of compartments.

The first embodiment of the present invention described so far is capable of transmitting, via a transmission path, sound data compressed by a sound data compressing technique using a high compression rate, while efficiently utilizing a sound data decoding device using a low compression rate employed in a karaoke device as a conventional sound reproducing device. This arrangement affords the superior benefit that a necessary time for data transfer can be significantly reduced.

Next, a second embodiment of the present invention will be described with reference to FIG. 6. Whereas the above-described first embodiment executes, after the decoding of vector-quantized data, an "intermediate" process to code the data into ADPCM data, the second embodiment is arranged to decode the vector-quantized data directly into PCM data without executing such an intermediate process.

Figure 6:
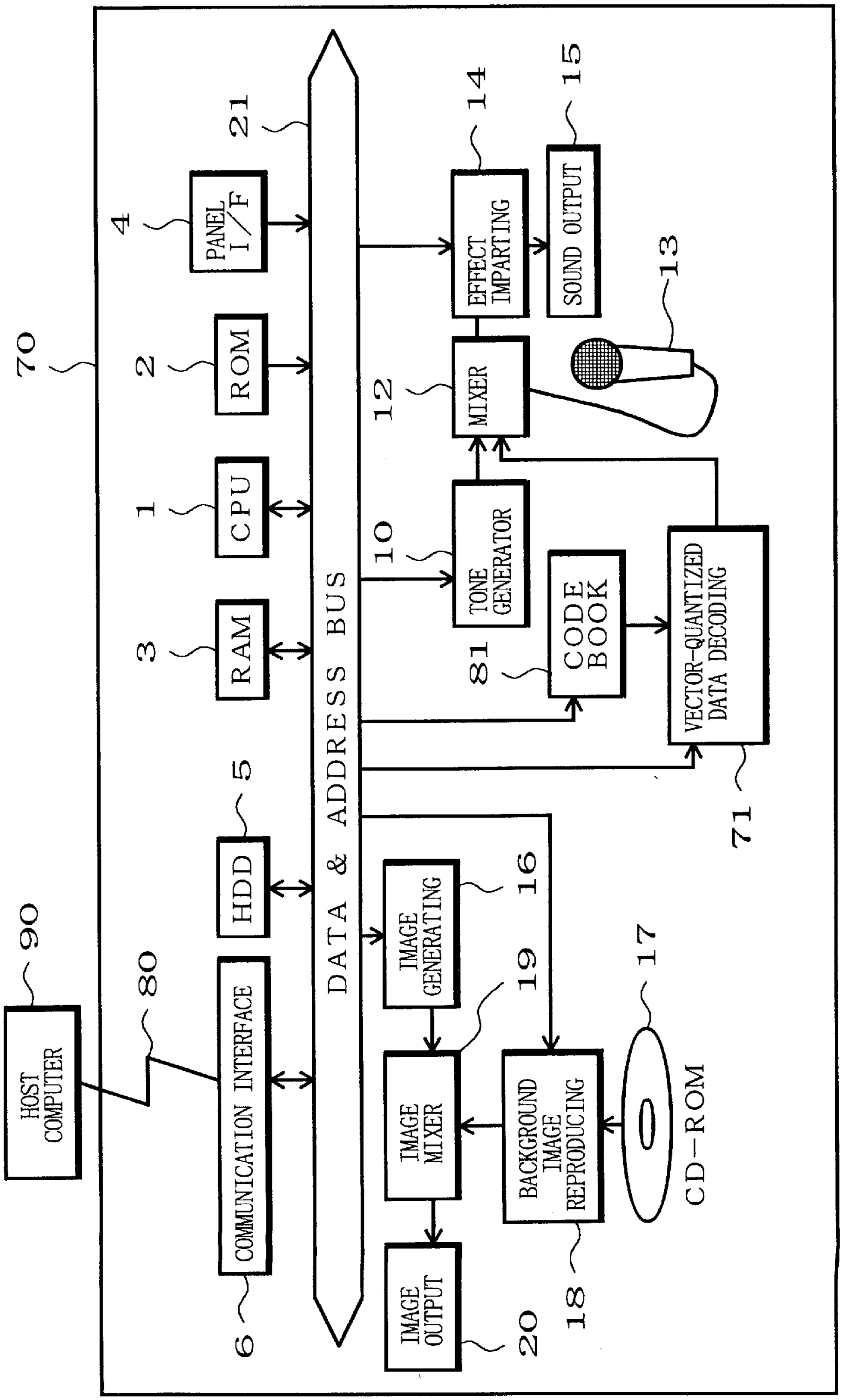
FIG. 6 is a block diagram illustrating an overall hardware structure of a second embodiment of the present invention.

The second embodiment of FIG. 6 is different from the first embodiment of FIG. 1 primarily in that it does not include the ADPCM coding device 9 and ADPCM data decoding device 11 of the first embodiment and that a vector-quantized data decoding device 71 and code book 81 are provided before the mixer 12; other components in the second embodiment are similar to those in the first embodiment and thus the following description centers around the different components.

In the second embodiment of FIG. 6, similarly to the above-described first embodiment, music piece data transmitted from the host computer 90 via the communication network 80, comprise a header section 31, a MIDI data section 32 and a sound data section 33 as shown in FIGS. 2A to 2C and has been compressed by the vector quantizing technique. The music piece data received via the karaoke device 70 via the communication interface 6 are stored into the hard disk device 5. Thus, in the second embodiment, vector-quantized data in the sound data section 33 is stored directly into the hard disk device 5 without being decoded at all.

For reproductive performance of a desired music piece, the vector-quantized data read out from the hard disk device 5 in accordance with an instruction recorded on the sound track is passed via the data and address bus 21 to the vector-quantized data decoding device 71, where it is decoded into original digital sound waveform data (PCM data) by use of the code book 81. The thus-decoded digital sound waveform data is fed to the mixer 12.

The second embodiment is characterized in that karaoke sound data is converted into vector-quantized waveform data and the converted vector-quantized waveform data is synthesized into an audible sound on the basis of the code book provided in a terminal karaoke device. With this feature, the second embodiment achieves a superior karaoke device that is capable of effectively reducing a time necessary for communicating music piece data and lessening the load on a terminal storage device.

Figure 7:
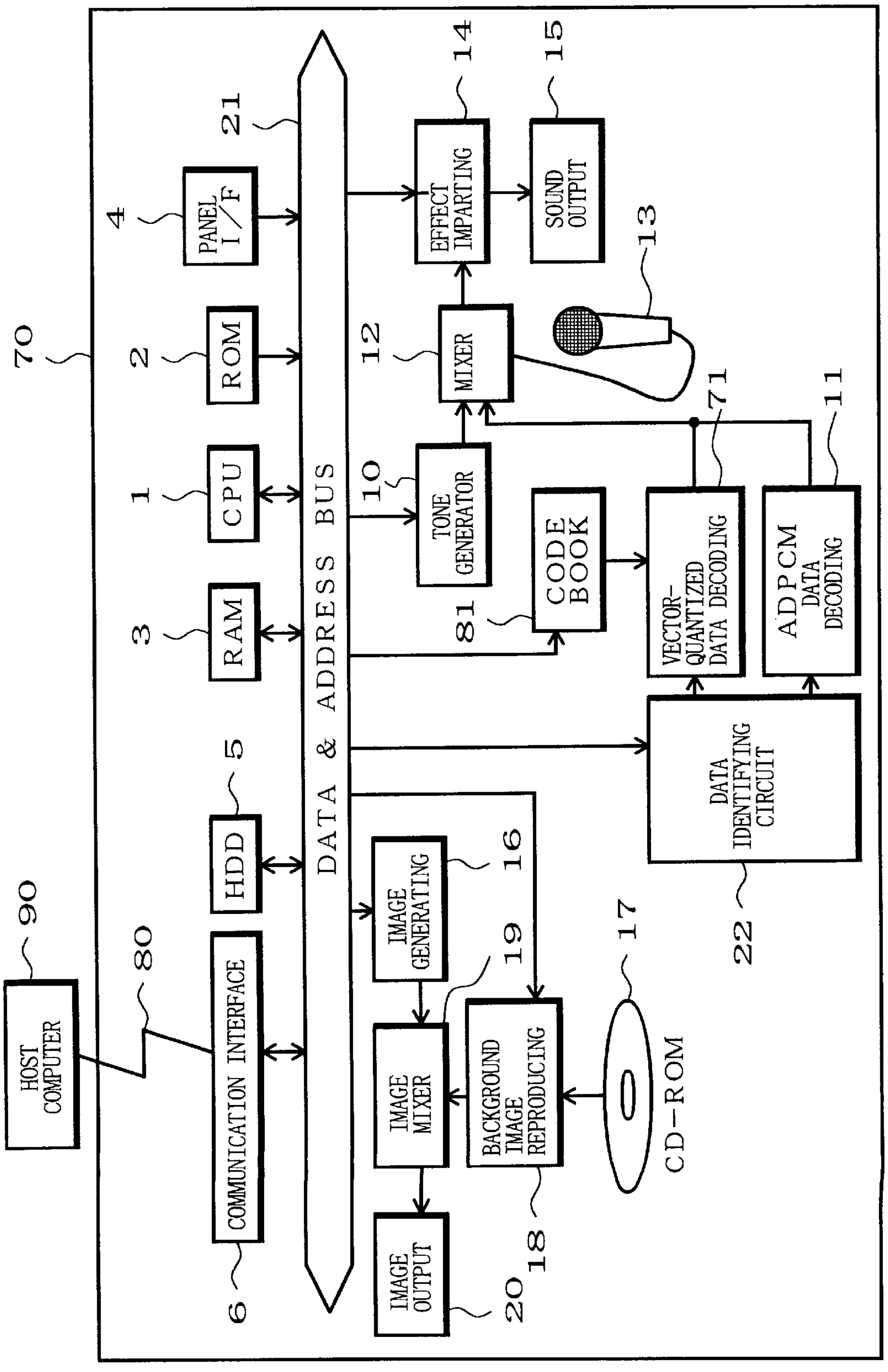
FIG. 7 is a block diagram illustrating an overall hardware structure of a third embodiment of the present invention.

Next, a third embodiment of the present invention will be described with reference to FIGS. 7 and 8. According to this third embodiment, of music piece data, sound data (in the sound data section 33 of FIG. 8) that can not be expressed as MIDI data is expressed in such a manner to be appropriately reproduced irrespective of whether it is ADPCM data or vector-quantized data. In FIG. 7, same elements as in the embodiment of FIG. 1 or 6 are represented by same reference numerals as in the figure and will not be described in detail to avoid unnecessary duplication.

Figure 8:
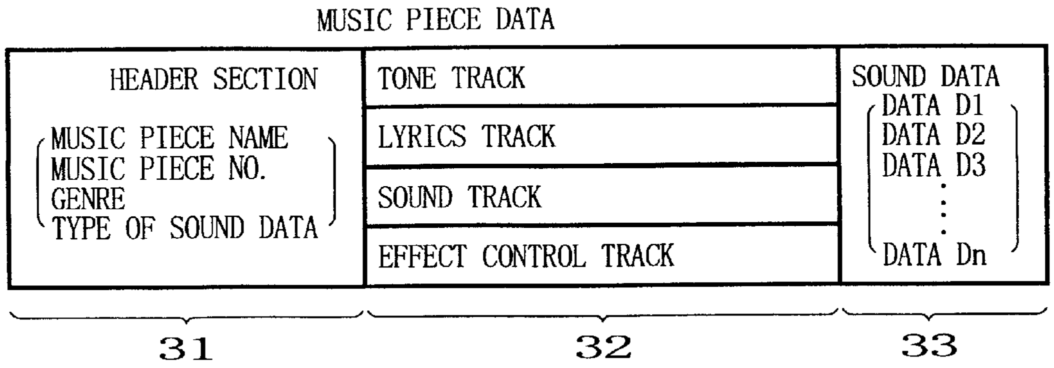
FIG. 8 is a diagram showing an exemplary format of music piece data to be used in the third embodiment of FIG. 7.

Music piece data transmitted from the host computer 90 via the communication network 80 are arranged in a format as shown in FIG. 8, which is generally similar to that of FIG. 2A, but slightly different therefrom in the data format in the header section 31 and also in that the data expression (i.e., data compression) in the sound data section 33 is by either ADPCM or vector quantization depending on the nature of the music piece. In FIG. 8, the header section 31 includes, in addition to the data indicative of a name, number, genre, etc., of the music piece of FIG. 2A, data that is indicative of a type of the data compression (i.e., ADPCM or vector quantization) employed in the sound data section 33. That is, the sound data section 33 may contain ADPCM data for one music piece and vector-quantized data for another music piece.

In the third embodiment of FIG. 7, similarly to the above-described first and second embodiments, the music piece data supplied from the host computer 90 via the communication network 80 are stored into the hard disk device 5. Then, in response to selection of a music piece to be performed, the music piece data of the selected music piece are sequentially read out from the hard disk device. More specifically, MIDI data of the individual tracks (in the MIDI data section of FIG. 8) are sequentially reproduced, and given sound sound data is read out from the sound data section 33 in accordance with sound designating information on the sound track (FIG. 2B). The read-out sound data is passed to a data identifying circuit 22 to identify whether the sound data is one compressed by the ADPCM or by vector quantizing technique. In accordance with the identified result, the sound data is delivered to the vector-quantized data decoding device 71 or to the ADPCM data decoding device 11. As an example, the data, contained in the header section 31, indicative of a compression type of the sound data is passed to the data identifying circuit 22, from which the sound data is delivered to the vector-quantized data decoding device 71 or to the ADPCM data decoding device 11 in accordance with the identified result. More specifically, if the sound data is identified to be vector-quantized data, it is delivered to the vector-quantized data decoding device 71, while if the sound data is identified to be ADPCM data, it is delivered to the ADPCM data decoding device 11.

As previously noted, the vector-quantized data decoding device 71 converts index information (FIG. 2C), contained in the delivered vector-quantized sound data, into a spectral pattern on the basis of the code book 81, and reproduces the original digital sound waveform data (PCM data) on the basis of the converted spectral pattern and auxiliary information (FIG. 2C). Then, the vector-quantized data decoding device 71 feeds the reproduced or decoded original digital sound waveform data to the mixer 12. The ADPCM data decoding device 11 subjects the delivered ADPCM data to bit-converting and frequency-converting processes, to thereby reproduce the original PCM sound data. Then, the ADPCM data decoding device 11 feeds the reproduced or decoded original PCM sound data to the mixer 12. Note that the ADPCM data decoding device 11 also has a function to vary the pitch of the decoded PCM sound data in accordance with predetermined pitch change information such as transposition data. Similarly, the vector-quantized data decoding device 71 has a function to vary pitch designating information (FIG. 2B) so as to shift a pitch of a reproduced sound (although not specifically described above, the other embodiments have this additional function).

In the above-described embodiment, the compression form of the sound data is set to not vary throughout a single music piece, and thus the data indicative of a type of compression form of the sound data is included in the header section 31. However, this is just illustrative, and the compression form of the sound data may be set to differ among data sets D1, D2, D3, . . . (FIG. 8) in the sound data section 33 of a music piece. In such a case, the data indicative of a type of compression form of the sound data to be used for an event may be prestored in the event data section (FIG. 2B) on the sound track so that the data read out from the section is used in the data identifying circuit 22 for the data type determination. Even in the case where the compression form of the sound data is set to not vary throughout a music piece, the data indicative of a type of compression form of the sound data may be prestored in a suitable storage device, other than the header section 31 (FIG. 8), such as an index table (not shown) for searching for a desired music piece.

Whereas each of the embodiments has been described as applied to a karaoke device, the present invention is also applicable to any other sound reproducing device. The present invention may also be applied to reproduction of any other sound than human voice.

Next, a fourth embodiment of the present invention will be described with reference to FIGS. 9 and 10. This fourth embodiment is characterized in that the vector quantizing technique described above in relation to the other embodiments is applied to an electronic game device.

Figure 9:
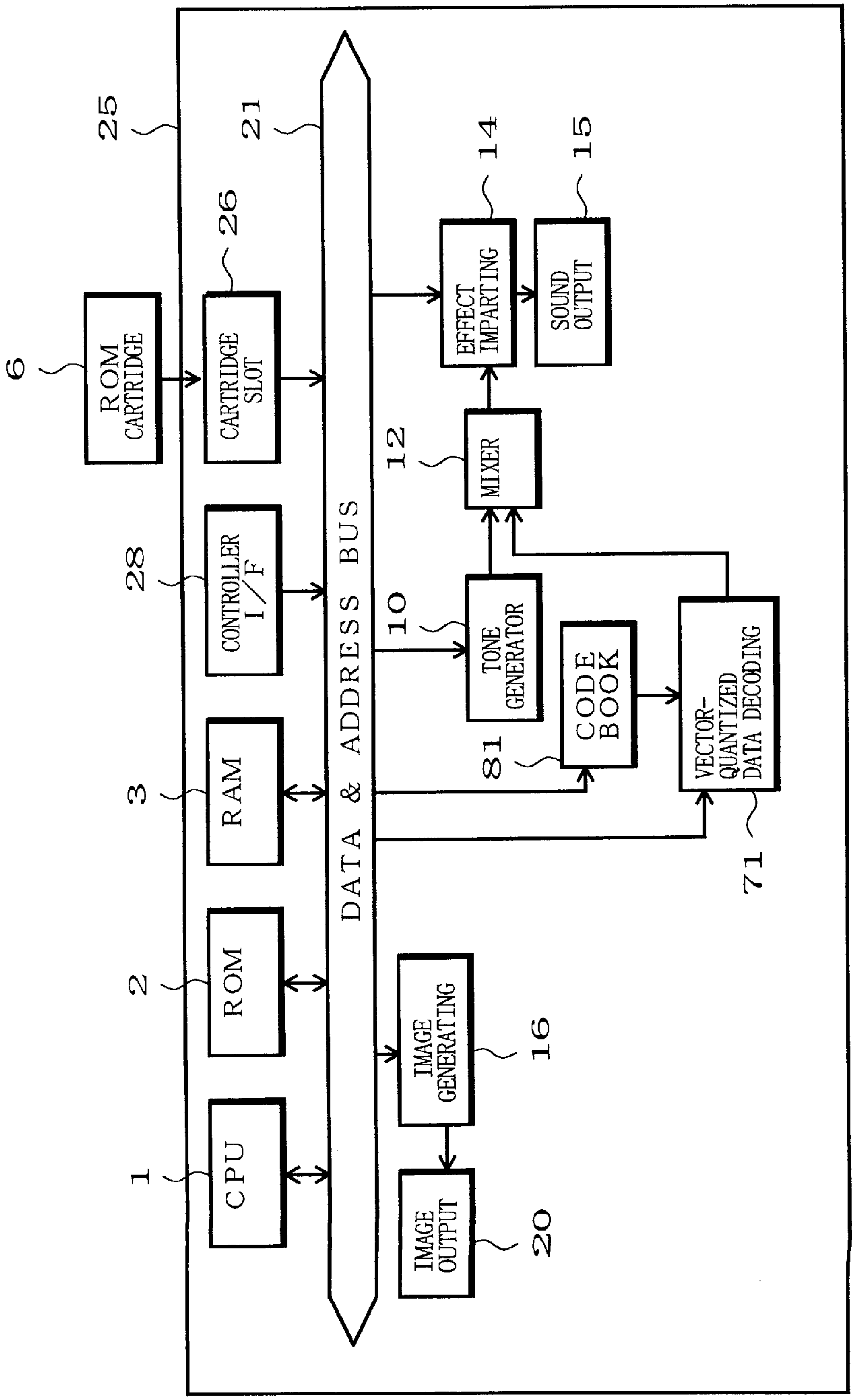
FIG. 9 is a block diagram illustrating an overall hardware structure of a game device according to a fourth embodiment of the present invention.

FIG. 9 is a block diagram showing the electronic game device 25 practicing the fourth embodiment of the present invention.

Figure 10:
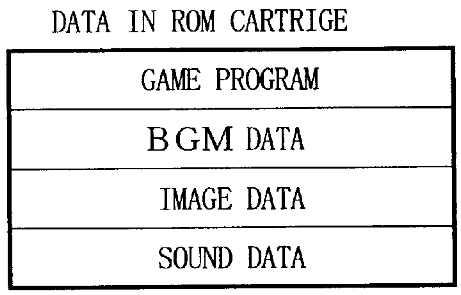
FIG. 10 is a diagram showing an exemplary data storage format of game-related information to be used in the fourth embodiment of FIG. 9.

In this embodiment, a ROM cartridge 27 has prestored therein a game program, and additional data, such as BGM data, image data and sound data, relating thereto, in a data format as shown in FIG. 10. The electronic game device 25 reads out the game program and various data so as to cause the game to progress, perform music, visually display images and generate sounds.

The ROM cartridge 27 has also prestored therein sound data compressed by the vector quantizing technique in such a manner that the game device 25 generates a sound by sequentially reading out the vector-quantized sound data.

The game device 25 executes various processes under the control of a microcomputer system which generally comprises a microprocessor unit (CPU) 1, a program memory (ROM) 2 and a working and data memory (RAM) 3. The CPU 1 controls the overall operation of the game device 25. In FIG. 9, elements represented by same reference numerals as in the embodiment of FIG. 1 or 6 have same functions as the counterparts in the figure and will not be described in detail to avoid unnecessary duplication.

Controller interface (I/F) 28 converts an instruction signal, from a performance operator such as a joy stick (not shown), into a signal processable by the CPU 1 and delivers the resultant converted signal to the data and address bus 21. A cartridge slot 26 is a terminal for connecting the ROM cartridge 27 to the data and address bus 21. As previously noted, the ROM cartridge 27 has prestored therein a game program, and BGM data, image data and sound data relating thereto.

The CPU 1 sequentially reads out the game program data, BGM data, image data and sound data from the ROM cartridge 27, and controls the progression of the game in accordance with control signals received via the control interface 4. In FIG. 10, the BGM data is automatic performance data conforming to the MIDI standards. The image data, which comprises texture data as well as data indicative of a background image, character pattern, coordinate apex or the like is delivered to the image generating circuit 16. Sound data, which is data relating to sound of a character's word or narration, is pre-compressed by the vector quantizing technique and delivered to the vector-quantized data decoding device 71. As with the sound data section 33 of FIG. 2A, the sound data comprises a plurality of sound data sets D1, D2, D3 . . .

More specifically, the BGM (Background Music) data includes a plurality of automatic performance MIDI data tracks corresponding to automatic performance parts, such as a melody part, chord part, rhythm part, as well as a sound track. MIDI data of the individual automatic performance parts, read out from the automatic performance MIDI data tracks, are supplied to the tone generator circuit 10, which in turn generates digital tone signals designated by the MIDI data. Data on the sound track is similar to that shown in FIG. 2B and includes sound data set D1, D2, D3, . . . to be sounded for each event. The data format of vector-quantized sound data in each sound data set is similar to that shown in FIG. 2C and arranged to include index information and auxiliary information for each of a plurality of frames. Vector-quantized sound data read out at given sounding timing is fed to the vector-quantized data decoding device 71, where it is decoded into PCM sound waveform data with reference to the code book 81. The mixer 12 adds together the decoded PCM sound waveform data and the digital tone signal from the tone generator circuit 10, and the mixed result is then passed to the effect imparting device 14.

Whereas the fourth embodiment has been described above in relation to the case where sound waveform data compressed by the vector quantizing technique are stored in the ROM cartridge, the sound waveform data may of course be stored in any other storage media such as a CD.

Further, where there is employed a storage media, such as a CD-ROM, having a relatively large capacity, the code book 81 and vector-quantized data decoding device 71 of the fourth embodiment may be implemented using the RAM 3 within the game device 25 while newest code book information is stored in the CD-ROM.

The game device according to the present invention affords the benefit that a high-quality sound can be generated with a small storage capacity.

What is claimed is:

1. A sound reproducing device comprising:

a receiving device that receives, from outside said sound reproducing device, sound data compressed with a predetermined first data compressing technique;

a first decoding device that decodes the sound data received via said receiving device;

a data compressing device that compresses the sound data, decoded by said first decoding device, with a predetermined second data compressing technique, said first data compressing technique using a data compression rate higher than a data compression rate used by said second data compressing technique;

a second decoding device that decodes the sound data compressed with said second data compressing technique; and a device that generates a sound signal based on the sound data decoded by said second decoding device.

2. A sound reproducing device as recited in claim 1 wherein the sound data compressed with said first data compressing technique is expressed by a combination of information specifying a spectrum pattern and a spectrum envelope of the sound data with a vector quantizing technique, and said second data compressing technique is based on an adaptive differential pulse code modulation technique.

3. A sound reproducing device comprising:

a receiving device that receives, from outside said sound reproducing device, sound data compressed with a predetermined first data compressing technique;

a first decoding device that decodes the sound data received via said receiving device;

a data compressing device that compresses the sound data, decoded by said first decoding device, with a predetermined second data compressing technique, said first data compressing technique using a data compression rate higher than a data compression rate used by said second data compressing technique;

a storage device that stores therein the sound data compressed with said second data compressing technique by said data compressing device;

a readout device that reads out the sound data from said storage device in response to a sound generating instruction;

a second decoding device that decodes the sound data read out by said readout device; and a device that generates a sound signal based on the sound data decoded by said second decoding device.

4. A method of transmitting sound data after compressing the sound data and reproducing the sound data in response to a request for real-time sounding, said method comprising the steps of:

transmitting, via a network, sound data compressed with a predetermined first data compressing technique;

receiving the sound data transmitted via the network;

cancelling a compressed state of the received sound data to thereby decode the sound data;

compressing the decoded sound data with a second data compressing technique that uses a data compression rate lower than a data compression rate used by said first data compressing technique;

storing into a memory the sound data compressed with said second data compressing technique;

reading out from said memory the sound data compressed with said second data compressing technique, in response to a request for real-time sounding;

decoding the sound data read out from said memory; and generating a sound signal based on said sound data decoded after being read out from said memory.

5. A music reproducing device comprising:

a storage device that stores therein automatic performance data to be used for a sequence performance of music, and sound data obtained by coding waveform data of an additional sound, to be reproduced with the music, in a first coding form based on a predetermined data compressing technique;

a receiving device that receives, from outside said sound reproducing device, sound data coded in a predetermined second coding form; said second coding form being based on a data compressing technique using a data compression rate higher than a data compression rate used for said first coding form;

a first decoding device that decodes the sound data received via said receiving device;

a data coding device that codes the sound data, decoded by said first decoding device, in said first coding form;

a device that allows the sound data, coded by said data coding device, to be stored into said storage device;

a readout device that reads out the automatic performance data and sound data from said storage device in accordance with a music reproducing instruction;

a tone generating device that generates a music sound on the basis of the automatic performance data read out from said storage device;

a second decoding device that decodes the sound data coded by said data coding device in said first coding form; and a device that mixes an additional sound based on the sound data decoded by said second decoding device with the music sound generated by said tone generating device, for sounding of a mixture of the additional sound and the music sound.

6. A music reproducing device as recited in claim 5 which reproduces karaoke music.

7. A karaoke music reproducing device comprising:

a storage device that, for a given karaoke music piece, stores therein music performance data to be used for reproduction of music and sound data to be reproduced with the music, the sound data being expressed in compressed data form by a combination of first information indexing a spectrum pattern and second information representing a spectrum envelope level with a vector quantizing technique;

a readout device that reads out the music performance data and the sound data from said storage device, in response to an instruction to reproductively perform the karaoke music piece;

a tone generating device that generates a music sound on the basis of the music performance data read out from said storage device;

a decoding device that decodes the sound data read out from said storage device in such a manner that the spectrum pattern indexed by said first information is read out from a table and levels of spectrum components corresponding to the read-out spectrum pattern are set in accordance with the spectrum envelope level represented by said second information, to thereby generate a sound waveform signal; and a device that acoustically generates a sound of the sound data decoded by said decoding device and the music sound generated by said tone generating device.

8. A karaoke music reproducing device as recited in claim 7 which further comprises a receiving device that receives, from outside said music reproducing device, the music performance data and the sound data of the given karaoke music piece and wherein the received music performance data and the sound data are stored into said storage device.

9. A karaoke music reproducing device as recited in claim 7 wherein said decoding device includes said table storing therein a plurality of spectrum patterns in such a manner that a specific one of the spectrum patterns is read out from said table in response to said first information, and a device that sets respective levels of individual spectrum component waveforms corresponding to the specific spectrum pattern read out from said table in accordance with said spectrum envelope and additively synthesizes the spectrum component waveforms of the set levels to thereby reproduce said sound waveform signal.

10. A karaoke music reproducing device as recited in claim 7 wherein stored contents of said table are rewritable by data given from outside said karaoke music reproducing device.

11. A karaoke music reproducing method comprising the steps of:

transmitting, via a network, music performance data and sound data of a given karaoke music piece, the sound data being expressed in compressed data form by a combination of first information indexing a spectrum pattern and second information representing a spectrum envelope level with a vector quantizing technique;

receiving the music performance data and the sound data transmitted via the network and storing the received music performance data and the sound data into a memory;

reading out the music performance data and the sound data from said memory, in response to a music reproducing instruction;

decoding the sound data read out from said memory in such a manner that the spectrum pattern indexed by said first information is read out from a table and levels of spectrum components corresponding to the read-out spectrum pattern are set in accordance with the spectrum envelope level represented by said second information, to thereby generate a sound waveform signal; and generating a music sound signal on the basis of the music performance data read out from said memory.

12. A music reproducing device comprising:

a data supply device that supplies music performance data to be used for reproduction of music and sound data to be reproduced with the music, the sound data being compressed with one of a plurality of different data compressing principles including at least one based on a vector quantizing technique;

an identifying device that identifies with which of the data compressing principles the sound data supplied by said data supply device is compressed;

a decoding device that decodes the sound data in accordance with the data compressing principle identified by said identifying device;

a tone generating device that generates a music sound on the basis of the music performance data supplied by said data supply device; and a device that acoustically generates a sound of the decoded sound data and the music sound generated by said tone generating device.

13. A music reproducing device as recited in claim 12 wherein said different data compressing principles include another one based on an adaptive differential pulse code modulation technique.

14. A music reproducing device as recited in claim 12 wherein the sound data supplied by said data supply device is compressed with a different data compressing principle for each music piece.

15. A music reproducing device as recited in claim 12 wherein the sound data supplied by said data supply device is compressed with a different data compressing principle for each predetermined portion of a music piece.

16. A music reproducing device as recited in claim 12 which reproduces karaoke music.

17. A music reproducing method comprising the steps of:

supplying music performance data to be used for reproduction of music and sound data to be reproduced with the music, the sound data being compressed with one of a plurality of different data compressing principles including at least one based on a vector quantizing technique;

identifying with which of the data compression principles the supplied sound data is compressed;

decoding the sound data in accordance with the identified data compressing principle;

generating a music sound on the basis of the supplied music performance data; and acoustically generating a sound of the decoded sound data and the generated music sound.

* * * * *